United States Patent [19]
Bloxom

[11] 3,783,525
[45] Jan. 8, 1974

[54] LEVEL

[76] Inventor: C. W. Bloxom, 1025 Devore Ave., Bakersfield, Calif. 93308

[22] Filed: May 26, 1972

[21] Appl. No.: 257,176

[52] U.S. Cl. .................................... 33/379, 33/383
[51] Int. Cl. .............................................. G01c 9/24
[58] Field of Search ...................... 33/379, 380, 381, 33/383, 384, 385, 367, 88, 89, 374; 356/148, 248, 249

[56] References Cited
UNITED STATES PATENTS

| 1,026,967 | 5/1912 | Swick .................................... 33/383 |
| 3,694,090 | 9/1972 | Oriyama ............................ 33/379 X |
| 963,959 | 7/1910 | Stratton ................................. 33/384 |
| 3,561,128 | 2/1971 | Ostrager ................................ 33/383 |
| 1,014,402 | 1/1912 | Larsen ................................... 33/383 |

Primary Examiner—John W. Huckert
Assistant Examiner—Milton S. Gerstein
Attorney—Huebner & Worrel

[57] ABSTRACT

A level having a body with an upper surface, the upper surface having a U-shaped passage provided therein having a curved end and legs defining parallel axes, the body also having a base for supporting the body at an angle of inclination along the axes of the legs in the direction of the curved end and relative to the base; a transparent plate mounted on the upper surface in sealing relation to the passage; and fluid disposed in the passage so as to define a bubble extending through the curved end of the passage and into the legs, the bubble having ends adapted to register the horizontal or vertical disposition of the base along an axis normal to the axes of the legs when said ends of the bubble define a line of reference normal to the axes of the legs.

12 Claims, 8 Drawing Figures

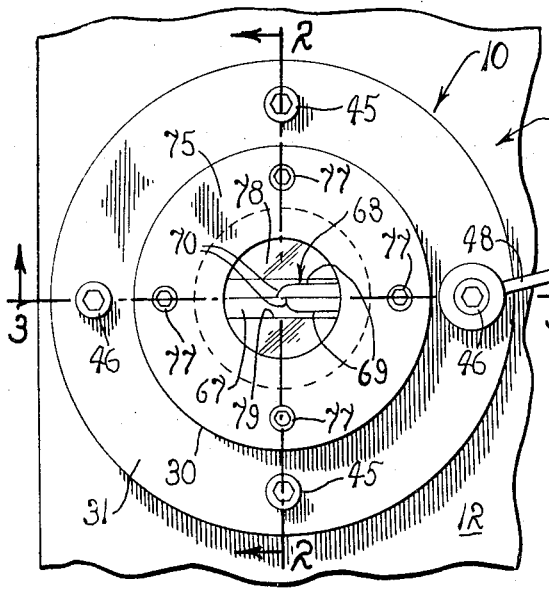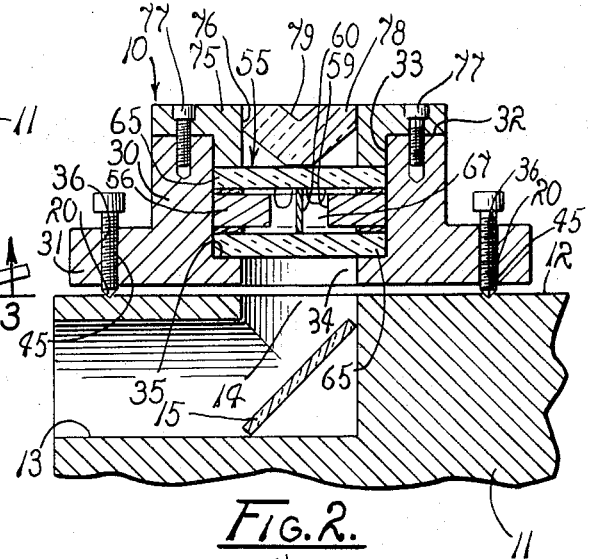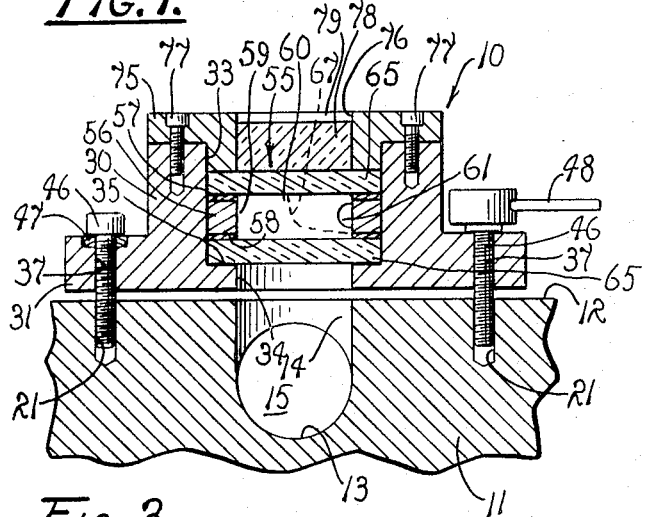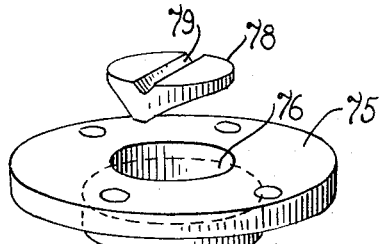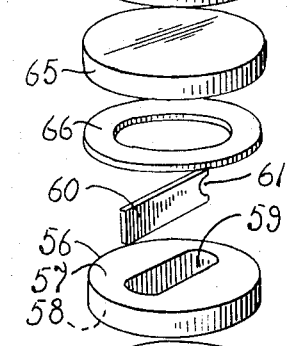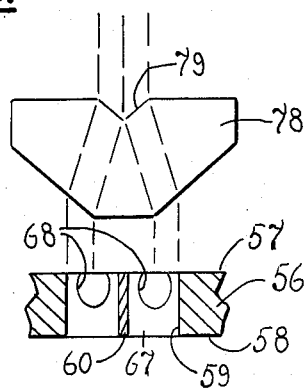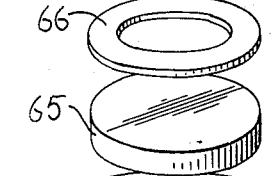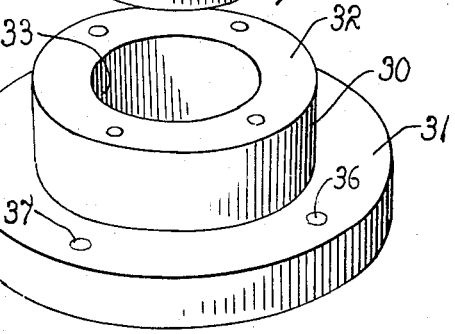

LEVEL

BACKGROUND OF THE INVENTION

The present invention relates to a level and more particularly to such a level which minimizes error due to temperature variation and imprecision in construction, is of significantly reduced size, and is adjustable to vary its sensitivity so as to permit use in a variety of types of situations requiring different degrees of sensitivity.

The prior art patents such as the Castor U.S. Pat. No. 601,629; the Ribalta U.S. Pat. No. 1,389,511; and the Schneider U.S. Pat. No. 801,221 relate primarily to levels which utilize ground glass tubes. The device of these patents typify prior art practices subject to deficiencies which the present invention has overcome, as will become more clearly apparent.

In various areas of endeavor such as construction, grading, surveying, aviation, and the like, it is of paramount importance to be able to determine vertical and horizontal lines and planes of reference with precision. It has long been known to use a sealed glass tube, having an interior surface ground in the form of an arc and gradations disposed on the tube in corresponding spaced relation to the center point of the arc, in association with an indicator bubble within the tube for indicating horizontal or vertical attitudes. Such levels, or spirit levels as they are sometimes called, take a variety of configurations. However, all conventional levels suffer from a variety of deficiencies irrespective of their particular configuration. These deficiencies significantly limit their precision and therefore usefulness in operation.

Conventional levels of substantial sensitivity are constructed in the form of a relatively long glass tube. The ratio of indicator fluid to air within the tube is normally in the neighborhood of fifty to one so that a relatively large proportion of fluid to air is present within the tube. During use of such levels, sunlight is frequently cast directly upon the glass tube transmitting heat to the fluid within the tube. Such heat causes the fluid to expand within the tube and thereby compress the air therein so as to reduce the size of the indicator bubble. The reduction in the size of the indicator bubble often results in the bubble contracting away from the spaced gradations on the tube so that the precise registry of level becomes difficult, if not impossible. A related problem resides in the fact that such sunlight can cause the glass tube itself as well as the indicator fluid to expand at one end thereof. Thus, a temperature differential between opposite ends of the tube interferes with the precision of the instrument.

The grinding of the arc within the glass tubes of such conventional levels is a quite difficult and expensive operation in order to produce a level of precise capability. Furthermore, positioning of the gradations on the levels requires extreme precision in order to prevent debilitating error. However, to produce a level of even moderate accuracy requires considerable precision in grinding of the arc and positioning of the gradations and generally a level of relatively large dimensions. Being large, such levels are extremely susceptible to damage and great care must be exercised during their use. This is particularly true at construction sites where the exposure to risk of damage is great.

The sensitivity of conventional levels is not adjustable due to the permanency of the arc ground therein. As a result, a level of relatively great sensitivity can be difficult to use under certain conditions where the work object is only roughly positioned. Even a minor shift in such an instrument produces a greatly exaggerated response in the movement of the indicator bubble. Thus, the bubble tends to vacillate from one end of the tube to the other during minor adjustment making precise adjustment quite difficult. Conversely, levels of limited sensitivity may be convenient for such rough positioning, but of very little use in more precise leveling. This frequently requires that two or more levels of varying degrees of sensitivity be used in order efficiently to perform a leveling task. This is both inconvenient and expensive.

Therefore, it has long been recognized as desirable to have an improved level which minimizes distortion during use, is relatively inexpensive to construct, is convenient to use, and is adjustable so as to vary the degree of sensitivity thereof.

SUMMARY OF THE INVENTION

It is an object of the present invention, therefore, to provide a level which is compact while possessing the capability of being adjusted to quite precise sensitivity.

Another object is to provide such a level which minimizes inaccuracy resulting from errors in construction as well as from environmental factors during use.

Another object is to provide such a level which permits reading in a flat plane.

Another object is to provide such a level which eliminates the necessity for having gradations marked on the level which contribute to the propensity for inaccuracy present in conventional levels.

Another object is to provide such a level which has an indicator bubble which is read against itself.

Another object is to provide such a level which possesses the capability of being adjusted so as to permit control of sensitivity from a rather rough to a nearly infinite degree of sensitivity.

A further object is to provide such a level which can be inverted so as to permit checking for error in the level itself.

A still further object is to provide such a level which permits the acquisition of ambient light for direction through the level so as clearly to display the indicator bubble for precise reading.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 1 is a top plan view of the level of the first form of the present invention.

FIG. 2 is a vertical section, taken on line 2—2 of FIG. 1.

FIG. 3 is a vertical section, taken on line 3—3 of FIG. 1.

FIG. 4 is an exploded perspective view of the level.

FIG. 5 is a diagrammatic illustration of the refractive effect of a refraction plate used on the level.

DESCRIPTION OF THE FIRST EMBODIMENT

Figure 6:
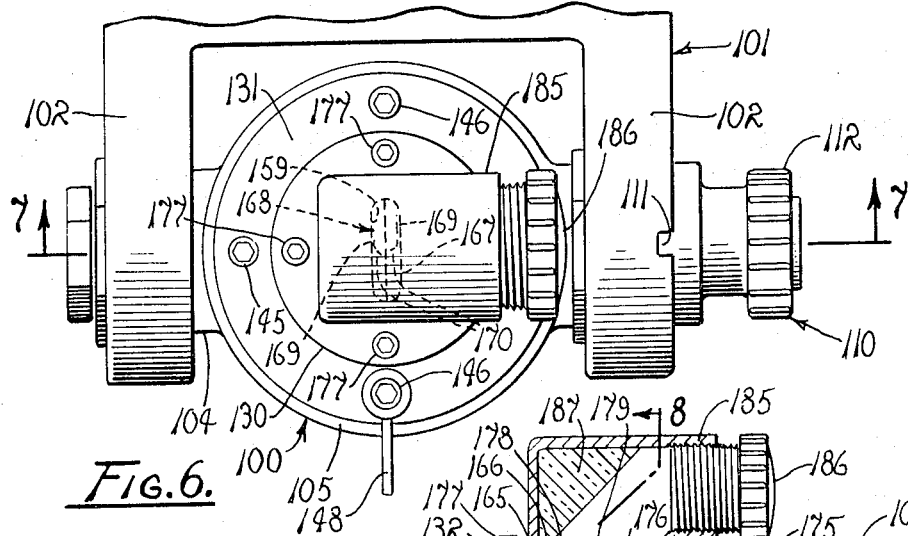
FIG. 6 is a top plan view of a second form of the present invention.

Referring more particularly to the drawings, FIG. 1 shows the level of the first form of the present invention generally indicated by the numeral 10. The level is mounted on a base 11 having a substantially flat upper surface 12. The base can be of any suitable configuration depending upon the particular use for whicl it is adapted. Preferably, it has a surface of support, not shown, which is parallel to the upper surface of the base and which is adapted to contact the work object which is to be levelled. However, as will subsequently be clarified, the level need not be provided with a base at all, but can be adapted for direct contact with the work object, although this eliminates at least one of its operative advantages.

As illustrated in the drawings and herein described, the level 10 is mounted on a base 11 having a right-angular light passage 13 in communication with the exterior of the base at one of its ends and having a reflection opening 14 communicating with the upper surface 12 thereof at the other of its ends. A mirror 15 is mounted in the passage in such a position that it collects ambient light received through the passage and reflects such light through the reflection opening.

A pair of depressions 20 are provided in the upper surface 12 of the base 11 in positions in equally spaced relation to the reflection opening. A pair of threaded bores 21 are provided in the upper surface of the base on opposite sides of the reflection opening so as to define a line normal to a line defined by the depressions, as best shown in FIG. 1.

The level 10 has a substantially cylindrical body 30 secured on the upper surface 12 of the base 11. The body has a radially extending peripheral flange 31, an upper surface 32, and an axially extending cylindrical chamber 33 which communicates with the upper surface. A passage 34 of somewhat smaller diameter than that of the chamber extends axially through the mount to communicate with the chamber so as to form a ledge 35, as best shown in FIGS. 2 and 3. A pair of threaded bores 36 are provided in the flange and extends therethrough in positions corresponding to those of the depressions 20 of the base 11. A pair of smooth bores 37 are also provided in the flange and extend therethrough in positions corresponding to those of the threaded bores 21 of the base.

The body 30 is secured on the base 11 by means of a pair of adjustment bolts 45 and a pair of mounting bolts 46. The adjustment bolts are individually screw-threadably received in the threaded bores 36 of the body so as to be engaged in the depressions 20 to maintain the body in adjustable spaced relation to the base, as best shown in FIG. 2. The mounting bolts are slidably received in the smooth bores 37 of the body and screw-threadably secured in the threaded bores 21 of the base, as best shown in FIG. 3. One of the mounting bolts has a compression spring 47 operatively interconnecting the bolt and flange. The other mounting bolt has a lever arm 48 mounted thereon and radially extending from the body. For use, the body is mounted on the base as described at a slight angle of inclination along an axis defined by the mounting bolts in the direction of the bolt having the lever arm. The arm is adapted to be employed selectively to thread the bolt into or out of the threaded bore 21 a short distance against compression of the spring 47 of the other bolt. Such adjustment permits increase or decrease of the angle of inclination of the body with respect to the base, the significance of which will subsequently be made more clearly apparent. When the body is mounted on the base, as described, the passage 34 of the body is in axial alignment with the reflection opening 14 of the base, as best shown in FIG. 2.

An indicator unit 55 is received in the cylindrical chamber 33 of the body 30 in resting relation on the ledge 35. The unit has a cell 56 having parallel upper and lower surfaces 57 and 58, respectively. An elongated passage 59, communicating with the upper and lower surfaces of the cell, is provided in the cell defining a longitudinal axis in alignment with the mounting bolts 46 of the body 30. A divider wall 60 is mounted longitudinally within the passage, as best shown in FIG. 2, so as to divide the passage in half and to define a curved end or opening 61 at the end thereof adjacent the lever arm 48. The passage is thereby made substantially U-shaped.

A pair of transparent plates 65 are individually mounted in parallel relation on the upper and lower surfaces 57 and 58, respectively, of the cell 56. The plates are mounted with seals 66 individually disposed between both plates and the cell so as to retain the plates in fluid-tight sealing relation to the divider wall 60 and cell. A predetermined quantity of a suitable indicator fluid 67, such as ether, is provided in the passage 59 so as to define a bubble 68 therein. The bubble is relatively long and return-bent or substantially U-shaped, having parallel legs 69 with ends 70, when correctly positioned. Adjustment of the angle of inclination of the body 30 with respect to the base 11 serves more importantly to adjust the angle of inclination of the indicator unit with respect to the base. With a slight angle of inclination in the direction of the lever arm, the bubble is disposed in its desired U-shaped configuration extending through the opening 61 with the legs thereof on opposite sides of the divider wall.

A top plate 75 having a passage 76 extending axially therethrough is mounted on the upper surface 32 of the body 30 by bolts 77. The top plate is mounted on the upper surface so that it is partially received within the cylindrical chamber 33 so as to engage the indicator unit 55 to maintain it in place within the chamber. A transparent refraction plate 78 is received in the passage of the top plate in engagement with the upper transparent plate of the indicator unit, as best shown in FIG. 2. The refraction plate has an upwardly displayed V-shaped groove 79. The refraction plate is positioned so that the vertex of the groove is positioned in precise parallel alignment with the divider wall 60 of the indicator unit.

DESCRIPTION OF THE SECOND EMBODIMENT

It will be seen that the present invention can take a variety of forms, depending upon the particular job requirements. The indicator unit 55 having the U-shaped bubble 68 displayed therein, can be mounted for use in any one of a wide variety of ways. That described in regard to the first embodiment of the invention is merely representative of one particular form shown for illustrative convenience. Furthermore, all that is essential in any form of the invention is the indicator unit itself utilizing a return-bent bubble. Thus, the construction of the passage 59 with the divider wall 60 mounted therein, and the equivalent structure of the second form of the invention to be described, could be replaced by a return-bent groove or similar structure in order to make possible a return-bent bubble. It is not necessarily required that provision be made for adjusting the angle of inclination of the indicator unit. Thus, an indicator unit can be constructed with a built-in angle of inclination for use in predetermined types of levelling operations without requiring use of the base 11.

Figure 7:
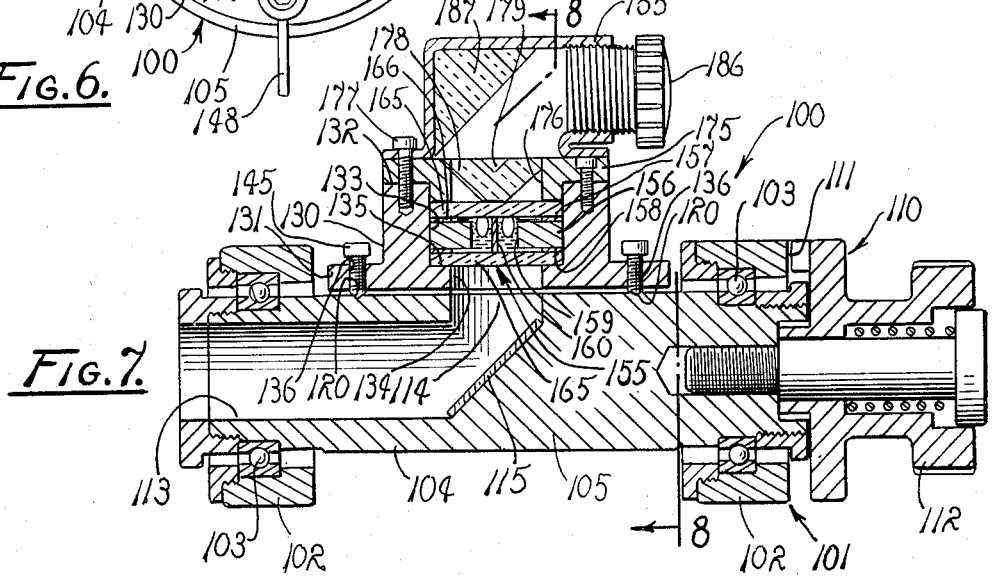
FIG. 7 is a longitudinal vertical section, taken on line 7—7 of FIG. 6.
Figure 8:
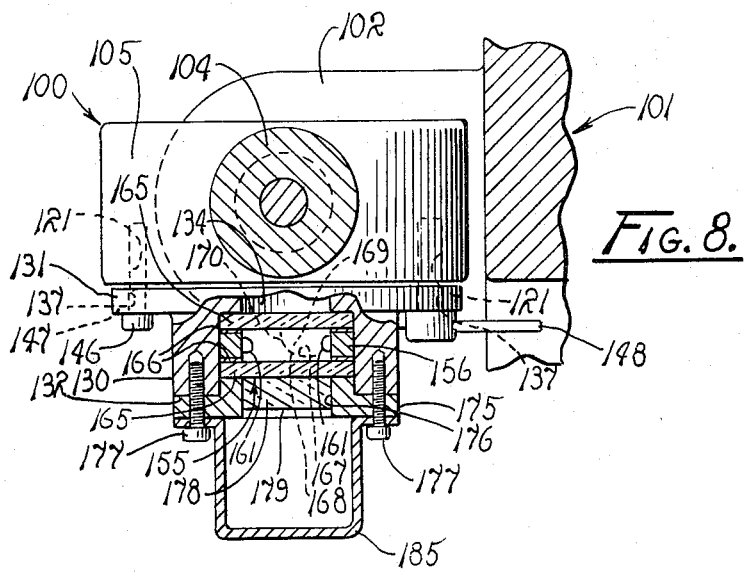
FIG. 8 is a fragmentary front elevation, taken from the position indicated by line 8—8 in FIG. 7, with the level shown in an inverted position.

The second form of level 100, shown in FIGS. 6, 7 and 8, is intended to be of a somewhat more sophisticated form for use on, for example, surveying instruments. Such an instrument is indicated by the numeral 101 and has spaced parallel arms 102 providing longitudinally aligned bearings 103 mounted therein. A base 104 is rotationally mounted in the bearings and has a substantially flat platform 105 integrally provided thereon and disposed between the arms.

A lock mechanism 110 is mounted at one end of the base in releasable engagement with the adjacent arm 102, as best shown in FIG. 7. A pair of slots 111 are provided in the arm 180° apart about the periphery of the bearing 103 and defining a true vertical line when the instrument 101 is properly positioned. The lock mechanism has a spring tension sleeve 112 which releasably engages the slots of the arm. Utilizing the lock mechanism, the platform 105 can be locked in two positions precisely 180° apart with respect to the axis of rotation. The base has a right-angular light passage 113 extending from the opposite end thereof to its center, as best shown in FIG. 7. The passage communicates with the exterior of the base for the collection of ambient light. The passage similarly communicates with the platform by way of a reflection opening 114 positioned concentrically of the platform. A mirror 115 is mounted within the passage so as to reflect ambient light received through the passage upwardly through the reflection opening.

As in the first form of the invention, a pair of depressions 120 are provided in spaced relation on opposite sides of the reflection opening 114 and define a line parallel to the axis of rotation of the cylindrical base 104. A pair of threaded bores 121 are also provided in the platform in spaced relation on opposite sides of the opening and defining a line normal to that of the depressions.

The level 100 has a body 130 having a peripheral flange 131, an upper surface 132, and a centrally positioned cylindrical chamber 133 which communicates with the reflection opening 114 through a smaller diameter passage 134. The smaller diameter of the passage with respect to that of the chamber defines a ledge 135. A pair of threaded bores 136 in positions corresponding to the depressions 120 and a pair of smooth bores 137 in positions corresponding to the threaded bores 121 are provided in the flange of the body. A pair of adjustment bolts 145 are individually screw-threadably received in the threaded bores 136 so as to engage the depressions of the platform. A pair of mounting bolts are individually received in the smooth bores 137 of the body and screw-threadably secured in the threaded bores of the platform. A compression spring 147 is disposed between one of the mounting bolts and the flange and a lever arm 148 is provided on the other mounting bolt.

An indicator unit 155 is received within the chamber 133 in resting relation against the ledge 135. As in the first form of the invention, the unit includes a cell 156 having upper and lower surfaces 157 and 158, respectively. The cell has an elongated passage 159 extending in axial alignment with a line defined by the mounting bolts. A divider wall 160 is mounted longitudinally within the passage so as to divide the passage in half and to define openings 161 at the opposite ends thereof. Thus, the divider wall defines a circular path about the wall within the passage.

The cell 156 has transparent plates 165 individually mounted on the upper and lower surfaces 157 and 158, respectively, in sealing relation to the passage 159 by means of seals 166 disposed therebetween. A suitable indicator fluid 167, such as ether, is provided in the passage so as to define a bubble 168 having legs 169 and ends 170. Ambient light is reflected through the indicator unit 155 by the mirror 155 of the base 104.

A top plate 175 having a passage 176 therethrough is mounted on the upper surface 157 of the cell 156 by means of bolts 177 to retain the indicator unit 155 in position. A transparent refraction plate 178 is received in the passage in engagement with the transparent plate on the upper surface of the indicator unit. The plate has a groove 179 the vertex of which is precisely aligned with the divider wall 160.

The bolts 177 also mount a housing 185 in covering relation to the refraction plate 178, as best shown in FIG. 7. An adjustable lens 186 is mounted in the housing so as to define a line of focus at right angles with respect to reflected light passing through the indicator unit 155 from the mirror 155. A mirror 187 is mounted within the housing so as to reflect light received through the refraction plate outwardly from the housing through the lens.

OPERATION

The operation of the described embodiments of the subject invention is believed to be clearly apparent and is briefly summarized at this point. Both forms of the invention 10 and 100 operate in substantially the same manner. In each instance, the level is positioned against a work object to be levelled. In the case of level 10, this positioning is accomplished in the conventional manner by direct contact of the base 11 with the work object. In the case of level 100, the instrument 101 has a structure, not shown, such as a tripod for contacting the work object. In both cases, the level is oriented so that the passages 34 and 134 are right-angularly related to the line along which levelling is to be accomplished.

Depending upon what particular levelling operation is to be performed, the lever arms 48 and 148 of both forms of the invention are adjusted so as to achieve the desired angle of inclination of the indicator units 55 and 155, respectively. In the first form of the invention, the angle of inclination disposes the bubble 68 so that it extends through the opening 61 in a U-shaped configuration on opposite sides of the divider wall 60. In the second form of the invention the bubble 168 extends similarly through one of the openings 161 when the platform is in an upwardly facing position and through the opposite opening when the platform is in an inverted position. The magnitude of the angle of inclination to which the unit is adjusted is inversely proportional to the sensitivity produced in the unit. Thus, for initial levelling or for the levelling of work objects in circumstances in which extreme accuracy is not required nor perhaps desired, the angle of inclination should be adjusted using the lever arm, so that it is of a relatively great magnitude. Gradations, not shown, can be provided on the flange below the lever arm so that the precise angle of inclination desired can be selected by movement of the lever arm above the selected gradation.

In both forms of the invention, reading of the indicator units 55 and 155, respectively, is accomplished in the same manner. After selection of the sensitivity desired using the lever arms 48 and 148, respectively, and positioning of the level so that the passages 59 and 159 are disposed normal to the line along which leveling is to be accomplished, the level is oriented so as to position the ends 70 and 170 of the bubbles 68 and 168 respectively in precise alignment. The refraction plates 78 and 178 of each form of the invention reflect the light of the remote halves of the ends of the bubble so as to dispose them in side-by-side relation, as indicated diagrammatically in FIG. 5. The image presented then is as shown in FIG. 1 so that precise alignment of the ends of the bubbles can be accomplished relatively easily. Of course, when the ends are in precise alignment, level has been determined within the range of sensitivity controlled by the adjustment of the lever arms 48 and 148.

Where more precise adjustment is desired the lever arms 48 and 148, respectively, can be adjusted to decrease the angle of inclination of the indicator units 55 and 155 thereby increasing the sensitivity. The potential for adjusting the levels 10 and 100 to increase sensitivity is nearly infinite. As the angle of inclination approaches precisely horizontal, the tendency of the bubble to float within the unit toward the raised end thereof becomes increasingly less pronounced. Of course, when true horizontal is reached, the bubble will no longer float to a raised end of the unit and therefore will break into segments within the passages 59 and 159 so as immediately to indicate that true horizontal has been reached by the indicator units as distinct from the base 11 and 104. The goal in adjusting the indicator units to the most sensitive adjustment is to approach as nearly as possible without reaching precise horizontal so that the bubble is still intact at the raised end of the passage.

It will be noted that through the use of the light passages 13 and 113 and the mirrors 15 and 115, ambient light in the area is collected and reflected through the indicator units 55 and 155 so that the image presented to the operator is sufficiently illuminated to permit precise reading of the level. It has been found that use of only one opening 61 at an end of the divider wall 60 in the first form of the invention permits the transparent plates 65 thereof to be constructed of glass other than that which has been optically ground without danger of significant error.

The level of the second form of the invention 100 differs from the first form in that provision is made for inversion of the indicator unit so as to permit checking of the unit 155 against itself for error. With the level disposed in the relationship shown in FIGS. 6 and 7, a first reading is taken by viewing through the lens 186. The lens is adjustable so as to permit precise focusing in order to obtain a precise reading. When a reading has been obtained by this means, as above described, the indicator unit 155 can be inverted precisely 180° to take a reading with the bubble against the opposite transparent plate 165. Inversion of the indicator unit is accomplished by grasping the sleeve 112 of the locking mechanism 110 to draw the sleeve out of engagement with the slots 111 and to rotate the cylindrical base 104 in the bearings 103 until the sleeves again engage the slots 111 and the platform 105 has been inverted 180°, as shown in FIG. 8. With the inversion, the bubble 168 floats to the opposite transparent plate and to the opening 161 opposite to that through which the bubble extended when reading in the prior position. This is due to the reversal of the angle of inclination as a result of rotation. The lens is subsequently adjusted to accommodate the difference in position in the bubble so as again to permit precise focusing. It will be noted that adjustment of the lever arm 168 can be accomplished in either position so as to permit adjustment of the angle of inclination of the indicator unit and thereby the sensitivity of the level.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A level for determining a pre-selected attitude comprising a body defining a plane of reference, the body having an upper surface; and indicator means mounted on the upper surface and defining a first axis adjacent to but canted relative to the plane of reference, and adapted to indicate when the plane of reference is disposed in the pre-selected attitude along a second axis normal to the first axis of the indicator means, said indicator means including a return-bent passage in the upper surface of the body, said passage having fluid disposed therein so as to define an indicator bubble having ends adapted to be disposed in side-by-side relation in the return-bent passage when the plane of reference is oriented in the pre-selected attitude.

2. The level of claim 1 in which the ends of the bubble defined by the fluid have predetermined corresponding portions and a refraction plate is mounted in covering relation to the passage so as to represent the corresponding portions of the ends of the bubble in juxtaposition when viewed through the plate to allow precise reading of the level.

3. A level for registering horizontal along a first axis comprising a body having upper and lower surfaces, and a longitudinal passage formed in the body defining a second axis right-angularly related to the first axis; a wall mounted within a longitudinally of the passage to divide the passage in half and define an opening at one end thereof; a transparent plate mounted on the upper surface in sealing relation to the passage and wall; means supporting the body at an angle of inclination in the direction of the opening along the second axis; and fluid disposed in the passage so as to define a bubble extending through the opening and on opposite sides of the wall, the bubble having ends which register the horizontal disposition of said means along the first axis when said ends define a line parallel to the first axis.

4. The level of claim 4 in which the passage and wall extend through the body and a second transparent plate is mounted on the lower surface of the body in sealing relation to the passage and wall adapted to permit ambient light to pass through the passage to assist in the observation of the disposition of the ends of the bubble.

5. The level of claim 3 in which the means includes a base having means for adjustably supporting the body for varying the angle of inclination of the body with respect to the base in order to adjust the tendency of the bubble to float to the opening end of the passage and thereby the sensitivity of the level.

6. The level of claim 5 in which the means for adjustably supporting the body includes a bolt which interconnects the body and the base in alignment with the second axis for increasing or decreasing the angle of inclination so as to adjust the sensitivity of the level from rough sensitivity to a precise sensitivity.

7. The level of claim 6 in which the wall provides a second opening at one end thereof opposite that defining the first opening in order to facilitate movement of the bubble in the passage.

8. A level for use on levelling instruments and the like for positioning in vertically standing relation so as to permit the determination of horizontal along a first axis, the level comprising a base mounted on the instrument so as to be positionable in an upwardly facing position and an inverted position; a body having opposite sides and a passage elongated along a second axis normal to the first axis; a wall mounted in the passage in alignment with the second axis so as to divide the passage and define openings at the opposite ends of the wall; a pair of parallel transparent plates individually mounted on the opposite sides of the body in sealing relation to the passage and wall; fluid received in the passage about the wall so as to define an indicator bubble having opposite ends adapted to register horizontal when the ends define a line parallel to the first axis; and the body being mounted on the base and inclined along the second axis so as buoyantly to motivate the bubble in the direction of the inclination and said body being positionable with the base in the upwardly facing and inverted positions so as alternately to motivate the bubble to opposite ends of the passage for the alternate registry of horizontal to permit a check for error within the level itself.

9. The level of claim 8 in which an adjustment bolt interconnects the body and the base for adjustment of the inclination of the body with respect to the base to permit varying the degree of sensitivity of the level.

10. A level for determining a pre-selected attitude comprising a body having a plane of reference; indicator means mounted on the body, said indicator means having a return-bent passage disposed in a plane adjacent to but canted relative to the plane of reference; and fluid disposed in the passage so as to define a return-bent bubble having ends which register the attitude of the plane of reference with respect to the horizontal by their relationship with respect to each other.

11. A level comprising a base having a predetermined erect plane of reference providing therein a predetermined axis of reference with respect to which the horizontal is to be compared; a substantially U-shaped transparent tube having adjacent legs interconnected by a return-bent portion mounted in the base in a plane which passes through the axis of reference, with the legs disposed transversely of the axis of reference and inclined toward the return-bent portion when the plane of reference is vertical; and a fluid disposed in the tube defining a return-bent bubble having opposite ends disposed in the opposite legs for visual comparison and which register when the axis of reference is horizontal.

12. In a level, an indicator comprising a substantially U-shaped transparent tube having legs in adjacent proximity interconnected by a return-bent portion, and a fluid partially filling the tube so as to define a return-bent bubble having opposite ends disposed in the legs for visual comparison of the positional relationship of said opposite ends of the bubble.

* * * * *

UNITED STATES PATENT OFFICE
CERTIFICATE OF CORRECTION

Patent No. 3,783,525           Dated January 8, 1974

Inventor(s)     C. W. Bloxom

It is certified that error appears in the above-identified patent and that said Letters Patent are hereby corrected as shown below:

In the Specification:

Col. 3, line 11, delete "whicl" and insert ---which---.

Col. 6, line 21, after "mirror" and before "of" delete "155" and insert ---115---.

Col. 6, line 35, after "mirror" and before the period "." delete "155" and insert ---115---.

In the Claims:

Col. 8, line 57, after "within" and before "longitudinally" delete "a" and insert ---and---.

Col. 9, line 1, delete "4" and insert ---3---.

Signed and sealed this 16th day of April 1974.

(SEAL)
Attest:

EDWARD M. FLETCHER, JR.
Attesting Officer

C. MARSHALL DANN
Commissioner of Patents